Oct. 22, 1929.  C. H. WILLIAMS  1,733,040
JUMP TRAP
Filed July 3, 1928
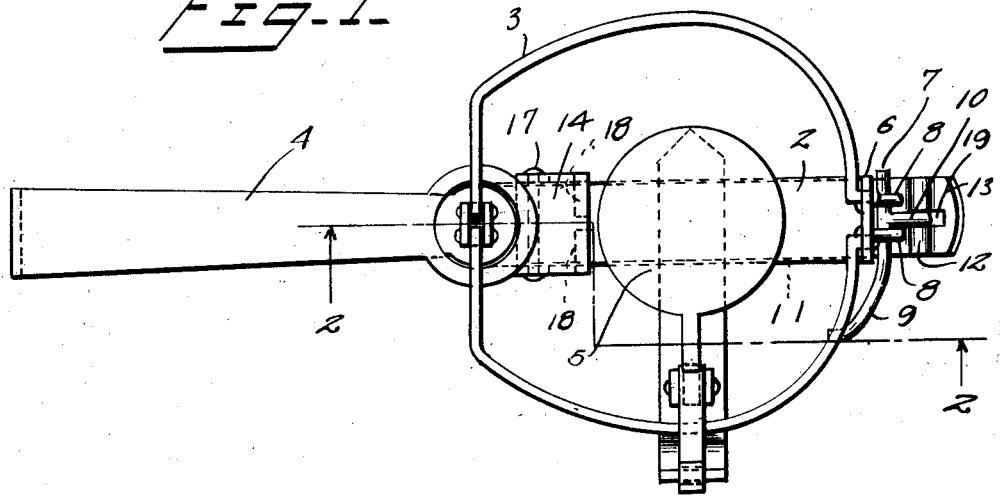
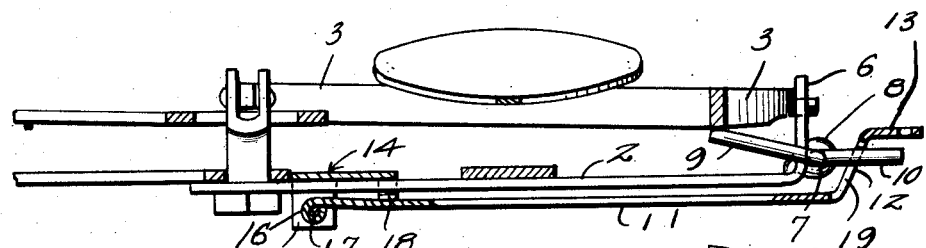
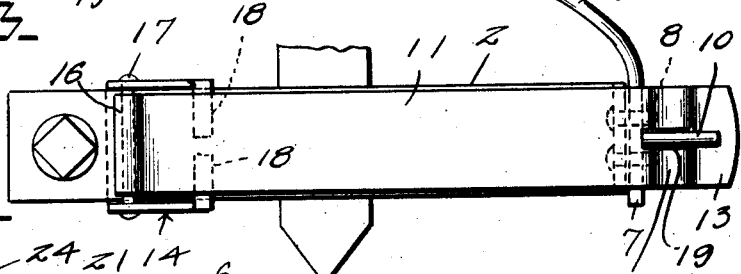
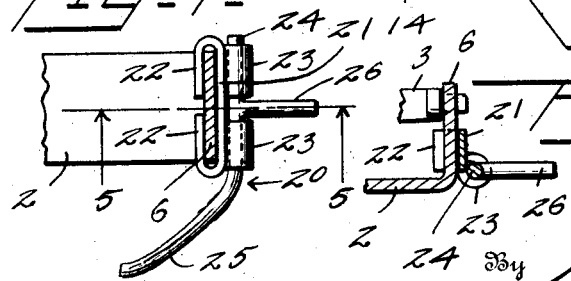
Inventor
C. H. Williams
By Watson E. Coleman
Attorney Patented Oct. 22, 1929

1,733,040

UNITED STATES PATENT OFFICE

CHARLES H. WILLIAMS, OF CARNATION, WASHINGTON

JUMP TRAP

Application filed July 3, 1928. Serial No. 290,062.

This invention relates to the class of trapping and pertains particularly to the class of jaw traps.

The primary object of this invention is to provide, in a manner as hereinafter set forth, an attachment for jaw traps, making jump traps of the same, the attachment consisting of a spring element, means for securing the same to the jaw trap, and an improved trigger mechanism operable simultaneously with the operation of the springing of the trap.

In trapping, numerous animals are lost through the fact that the traps which are set for them become embedded in mud or slightly frozen to the ground thereby being retarded in their actions after being sprung, a portion of the spring strength being expended in extricating the trap from the mud or loosening it from the ground. When an animal coming out of water places a wet foot into a trap, it frequently escapes, first because of the fact that as soon as the trap begins to close the animal rapidly withdraws its foot and if the trap is frozen or in any way stuck, its closing operation will be so slow that the animal's foot will be out of the way before the jaws come together, and second because of the fact that the animal's foot is slippery and even though the jaws might engage the foot the slipperiness of the same will enable the animal to get it out before the full force of the spring is exerted upon the jaws.

In view of the foregoing, it will be readily seen that it is desirable that some means be provided whereby an additional force is employed for lifting the trap from the ground to follow the animal's foot as it withdraws the same and to this end the present improved spring projecting attachment has been devised together with the improved control trigger used in association with the spring.

A further object of the invention is to provide a spring and trigger structure which may be attached to any jaw trap to convert the same to a jump trap.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:—

Fig. 1 is a top plan view of a trap equipped with the jump spring structure embodying the present invention;

Fig. 2 is a sectional view taken upon the line 2—2 of Figure 1;

Fig. 3 is a bottom plan view of the trap base showing the jump spring in set position;

Fig. 4 is a sectional view through the upturned end of the trap base showing the detachable trigger applied thereto;

Fig. 5 is a sectional view taken upon the line 5—5 of Figure 4.

Referring to the drawing in detail wherein like numerals of reference indicate corresponding parts throughout the several views, the numeral 1 indicates generally a jaw trap of the usual design, the base portion thereof being indicated by the numeral 2, the jaws being indicated at 3 and the spring controlling the jaws being indicated at 4. The trigger control mechanism for the jaws is indicated as a whole by the numeral 5.

At its forward end, the base 2 is turned upwardly as at 6 and has pivoted therein, in the usual manner, one end of each of the jaw members 3.

The trigger mechanism embodying a portion of the present invention comprises an oscillating bar 7 which is mounted in any suitable manner upon the forward face of the upturned portion 6 of the base as indicated at 8, in the present instance the mounting for the bar comprising a pair of eye members of the type shown. The bar extends transversely of the upturned portion and one end projects a substantial distance laterally and rearwardly forming the curved arm 9 upon which one of the trap jaw members bears when the trap is set.

The bar 7 carries the right angularly extending trigger finger 10 which is arranged between the eye members 8 and in addition to holding the jump spring in place as will be hereinafter described, serves to prevent the bar 7 from coming out of its supporting eyes or bearings 8.

The jump spring comprising the other portion of the present invention is indicated by the numeral 11 and as shown, this spring is in the form of an elongated arcuate body having one end turned upwardly as indicated at 12, this upturned end terminating in the substantially horizontal tongue portion 13.

At its other end, the jump spring 11 carries an attaching saddle which is indicated as a whole by the numeral 14 by means of which it is secured to the base 2 of the trap. This saddle carries a pair of depending ears 15 between which the end of the spring positions, this end being rolled to form a sleeve 16 through which sleeve and through the ears 15, there extends a pivot pin 17. The saddle 14 also carries at each side edge a finger 18 which, when the saddle is placed in position over the base plate 2 of the trap is bent under against the lower face of the base to maintain the spring in position. This connection of the saddle with the trap base 2 is made at a point adjacent the other ends of the trap jaws 3.

In the use of the present invention, when the trap jaws are spread apart to set the trap, the free end of the jump spring is bent upwardly and the trigger 10 engaged in the slot 19 which is formed in the upturned portion 12 of the spring. This places the rearwardly curved arm 9 of the trigger in a substantially horizontal position so that when the jaws 3 are spread, one of the jaws will bear down upon this arm and will keep it in this position so long as the trap remains unsprung. When an animal places his foot upon the trigger mechanism 5 of the trap to cause the release of the trap jaws, the arm 9 is simultaneously released, permitting the jump spring to fly downwardly thereby kicking or causing the trap to jump into the air while the jaws of the trap are moving towards closed position. In this manner, even though the animal hastily attempt to withdraw his foot from a position where the jaws of the trap would close thereon, the trap will follow the foot upwardly and thus secure it.

It is to be pointed out that with the present jump spring structure, the activity of the trap spring and of the jaws is in no manner interfered with, in fact, the jump spring by normally acting to force the arm 9 upwardly assists in the movement of the trap jaws to closing position as soon as the trap trigger mechanism is released.

It will also be seen that with this structure, the spring may be readily applied to or removed from any trap base, and in order to adapt it for use upon traps which are not provided with the permanently mounted trigger 10, I have provided a detachable trigger member which is indicated as a whole by the numeral 20 and shown in detail in Figure 4. This detachable trigger comprises a plate 21, each end of which is designed to be bent inwardly as indicated at 22 so that when the plate is arranged across the outer face of the upturned end 6 of the trap base, the inturned ends will act to secure the plate in position thereon.

A pair of spaced guides or bearings 23 is formed on the outer face of the plate 21 and through these bearings, the oscillating bar 24 extends, one end of the bar being extended a substantial distance laterally and rearwardly forming the curved arm 25 while from the bar between the bearings 23, there extends the trigger 26 which, of course, acts in the same manner as the trigger 10 above described. The application and operation of this removable trigger is exactly the same as the fixed trigger as will be readily understood.

By hingedly mounting the jump spring 11 upon the trap base 2, the animal is prevented from catching the spring in brush or roots when it attempts to drag the trap away.

From the foregoing description it will be readily seen that the structure herein described may be readily attached to a jaw trap and will effectively operate to lift the trap from position when it is sprung.

Having described my invention what I claim is:—

1. In combination with a jaw trap having a base, an elongated spring member secured at one end to the base against the under face thereof, an oscillating bar carried upon the base, a finger carried by the bar for engaging said spring to hold the same in set position, and an arm carried by the bar and designed to be held in a predetermined position against the tension of the spring by one of the jaws of the trap when the same is set.

2. In combination with a jaw trap including a base, a pair of jaws pivotally mounted on the base and a spring controlling the jaws, a jump spring attached at one end to the trap base and having its other end extending beyond one end of the base, a trigger member comprising a bar mounted transversely of the base for oscillation thereon, means carried by the bar for engagement with the adjacent extended end of the jump spring, and an arm carried by the bar and curving laterally to be held by one of the trap jaws of the set trap bearing thereover to maintain the jump spring under tension.

3. In combination with a jaw trap including a base, a pair of jaws pivotally mounted on the base and a spring controlling the jaws, a jump spring attached at one end to the trap base and having its other end extending beyond one end of the base, a trigger member comprising a bar mounted transversely of the base for oscillation thereon, means carried by the bar for engagement with the adjacent extended end of the jump spring, and an arm carried by the bar and curving laterally to be held by one of the trap jaws of the set trap bearing thereover to maintain the jump spring under tension, said jump spring being pivotally attached to the trap base.

4. In combination with a jaw trap including a base, jaw members carried thereby, and a spring controlling the jaw members, an arcuate jump spring, a saddle, a hinge connection between one end of said spring and said saddle, means for securing said saddle to the trap base, and a trigger element carried by the base and adapted to engage the jump spring and in turn to be held in set position by one of the jaws of the trap when the same is set.

5. A jump spring and control trigger attachment for a jaw trap having a base upturned at one end and having jaws pivotally mounted on the base, an elongated arcuate spring body, means for securing one end of the body to the trap base to position the other end thereof adjacent the upturned end of the base, said spring having its free end upturned and provided with a slot, a plate designed to be detachably mounted upon the upturned end of the trap base, a bar mounted for oscillatory movement upon the plate, a trigger finger carried by the bar and designed to engage in the slot in the jump spring to maintain the spring in tensioned position, and an arm carried by the oscillatory bar and designed to be held by one of the jaws of the trap to maintain the trigger finger and jump spring in set position.

6. In a trap structure of the character described, a spring element secured to the under face of the base of the trap, a trigger element carried by the base for engaging and holding said spring under tension, and means whereby, when the trap is set, one of the jaws thereof will secure the trigger against movement, the release of said jaws releasing the trigger and permitting the spring to project the trap upwardly.

7. In combination with a jaw trap having a base, an elongated spring member secured at one end of the base against the under face thereof, a trigger member carried by the base and designed to hold the spring under tension when the trap is set, and means whereby one of the jaws of the trap when in set position will act to maintain the trigger in engagement with the tensioned spring.

In testimony whereof I hereunto affix my signature.

CHARLES H. WILLIAMS.